No. 886,665. PATENTED MAY 5, 1908.
E. TAYLOR.
COVERING ATTACHMENT FOR SEED PLANTERS.
APPLICATION FILED JAN. 31, 1908.
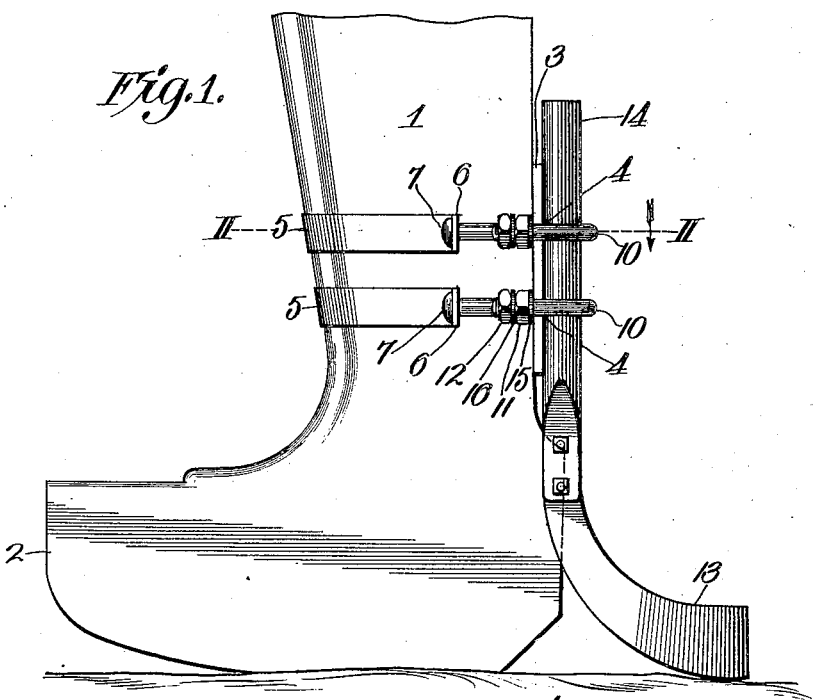
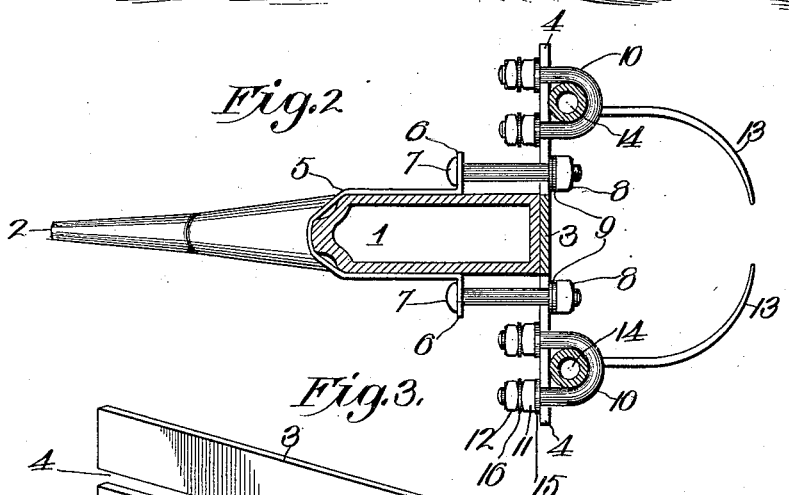
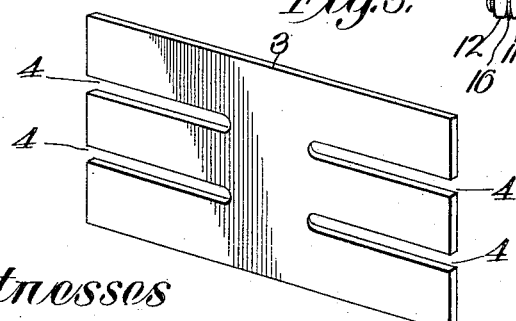
Witnesses
Frank R. Glore
H. C. Rodgers
Inventor
Edwin Taylor.
By George H. Thorp Atty

UNITED STATES PATENT OFFICE.

EDWIN TAYLOR, OF EDWARDSVILLE, KANSAS.

COVERING ATTACHMENT FOR SEED-PLANTERS.

No. 886,665.

Specification of Letters Patent.

Patented May 5, 1908.

Application filed January 31, 1908. Serial No. 413,703.

*To all whom it may concern:*

Be it known that I, EDWIN TAYLOR, a citizen of the United States, residing at Edwardsville, in the county of Wyandotte and State of Kansas, have invented certain new and useful Improvements in Covering Attachments for Seed-Planters, of which the following is a specification.

This invention relates to covering attachments for seed planters and my object is to produce an attachment of this character for use upon the hollow shank of the runner or furrow opener and capable of easy and quick adjustment laterally and vertically to turn more or less earth into the furrow for the purpose of covering the seed in the latter to the required depth.

A further object is to produce an attachment of this character of simple, strong, durable and inexpensive construction, and capable of application to any of the approved types of seed or corn planters.

With these objects in view and others as hereinafter appear, the invention consists in certain novel and peculiar features of construction and organization as hereinafter described and claimed; and in order that it may be fully understood reference is to be had to the accompanying drawing, in which—

Figure 1, is a side elevation of a part of the runner or furrow opener of a corn planter equipped with attachments embodying my invention. Fig. 2, is a horizontal section taken on the line II—II of Fig. 1. Fig. 3, is a detail perspective view of a plate forming part of the attachment.

In the said drawing, 1 indicates the hollow shank of a runner or furrow opener 2, of the type generally found in corn planters.

3 indicates a plate arranged against the rear edge of the shank and provided in its opposite side edges with slots 4.

5 indicates clips engaging the front edge and sides of the shank and terminating at their rear ends in outwardly projecting arms 6.

7 indicates bolts extending through arms 6 and the alined slots 4 and engaged at their rear ends by clamping nuts 8, suitable washers 9 being interposed, by preference between the nuts and plate 3 and bridging the slots of the latter.

10 indicates U-bolts extending forwardly through slots 4 engaged by nuts 11 and 12 at the front side of plate 3, the former being clamping nuts and the latter lock nuts to guard against accidental backward turning or unscrewing of the former. By means of these clamp nuts the coverers 13 are secured to shanks 1, the coverers being of the form and arrangement shown in the drawings for the purpose of forcing the loose earth into the furrow made by the runner, the object being to utilize such loose earth in covering the grain dropped into such furrow through the shank 1 in the usual or any preferred manner. The coverers are provided with upwardly projecting tubular stems 14 extending through the alined U-bolts 10 and clamped by the latter rigidly against plate 3 through the medium of the bolts 11 hereinbefore mentioned, suitable washers 15 and 16 being preferably interposed between nuts 11 and plate 3 and said nuts and nuts 12 respectively.

From the foregoing it will be seen that the attachment can be secured to or removed from the hollow shank easily and quickly and can be vertically adjusted bodily on said shank by first loosening clamping nuts 8 and can be clamped in its new position by reversing the operation of the nuts. Vertical adjustment of the coverers can also be effected by loosening the clamping U-bolts and by performing the same operation, the coverers can be swung toward or from each other. By adjusting them vertically they can be caused to cover the grain to a greater or less depth and the same object can be accomplished by the lateral adjustment of the coverers, it being obvious that the greater the distance apart they are disposed the more or less earth they will force inward over the grain. By providing the plate 3 with the slots 4, it is possible to vary the distance between the coverers bodily as well as by turning them with the U-bolts as the axis of such movement, it being also apparent that said slots permit the plate to be employed on shanks of varying thickness as the bolts 7 are adjustable in said slots, it being apparent of course that the clips could be bent to fit shanks of different size and form. It will be apparent of course that the invention is susceptible of modification in minor particulars without departing from the principle of construction involved.

Having thus described the invention what I claim as new and desire to secure by Letters-Patent, is:—

1. The combination with the hollow shank of a seed planter, of a plurality of clips engaging the front edge and sides of the shank, a plate fitting against the rear edge of the shank and projecting laterally beyond the same, clamping devices connecting the clips and said plate and clamping said parts rigidly on the shank, a pair of coverers arranged at opposite sides of and projecting rearwardly with respect to the shank, and provided with upwardly projecting stems fitting against said plate, and means for clamping said stems rigidly to said plate.

2. The combination with the hollow shank of a seed planter, of a plurality of clips engaging the front edge and sides of the shank, a plate fitting against the rear edge of the shank and projecting laterally beyond the same, clamping devices connecting the clips and said plate and clamping said parts rigidly on the shank, a pair of coverers arranged at opposite sides of and projecting rearwardly with respect to the shank, and provided with upwardly projecting stems fitting against said plate, U-bolts engaging said stems and extending through said plate at opposite sides of the shank and clamping nuts engaging the U-bolts at the opposite side of the plate from said stems and clamping the latter rigidly in position.

3. The combination with the hollow shank of a seed planter, of a plurality of clips engaging the front edge and sides of the shank, a plate fitting against the rear edge of the shank and projecting laterally beyond the same, and provided with slots extending transversely of the shank, clamping devices connecting the clips and said plate and clamping said parts rigidly on the shank, a pair of coverers arranged at opposite sides of and projecting rearwardly with respect to the shank, and provided with upwardly projecting stems fitting against said plate, U-bolts engaging said stems and extending through the slots of said plate at opposite sides of the shank, and clamping nuts engaging the U-bolts at the opposite side of the plate from said stems and clamping the latter rigidly in position.

4. The combination with the hollow shank of a seed planter, of a plurality of clips engaging the front edge and sides of the shank, a plate fitting against the rear edge of the shank and projecting laterally beyond the same, clamping devices connecting the clips and said plate and clamping said parts rigidly on the shank, a pair of coverers arranged at opposite sides of and projecting rearwardly with respect to the shank, and provided with upwardly projecting cylindrical stems fitting against said plate, U-bolts engaging said stems and extending through said plate at opposite sides of the shank and clamping nuts engaging the U-bolts at the opposite side of the plate from said stems and clamping the latter rigidly in position.

In testimony whereof I affix my signature, in the presence of two witnesses.

EDWIN TAYLOR.

Witnesses:
H. C. RODGERS,
G. Y. THORPE.